April 9, 1963
G. V. COPLAND ET AL
3,084,548
PRESSURE TRANSMITTER
Filed Aug. 1, 1960
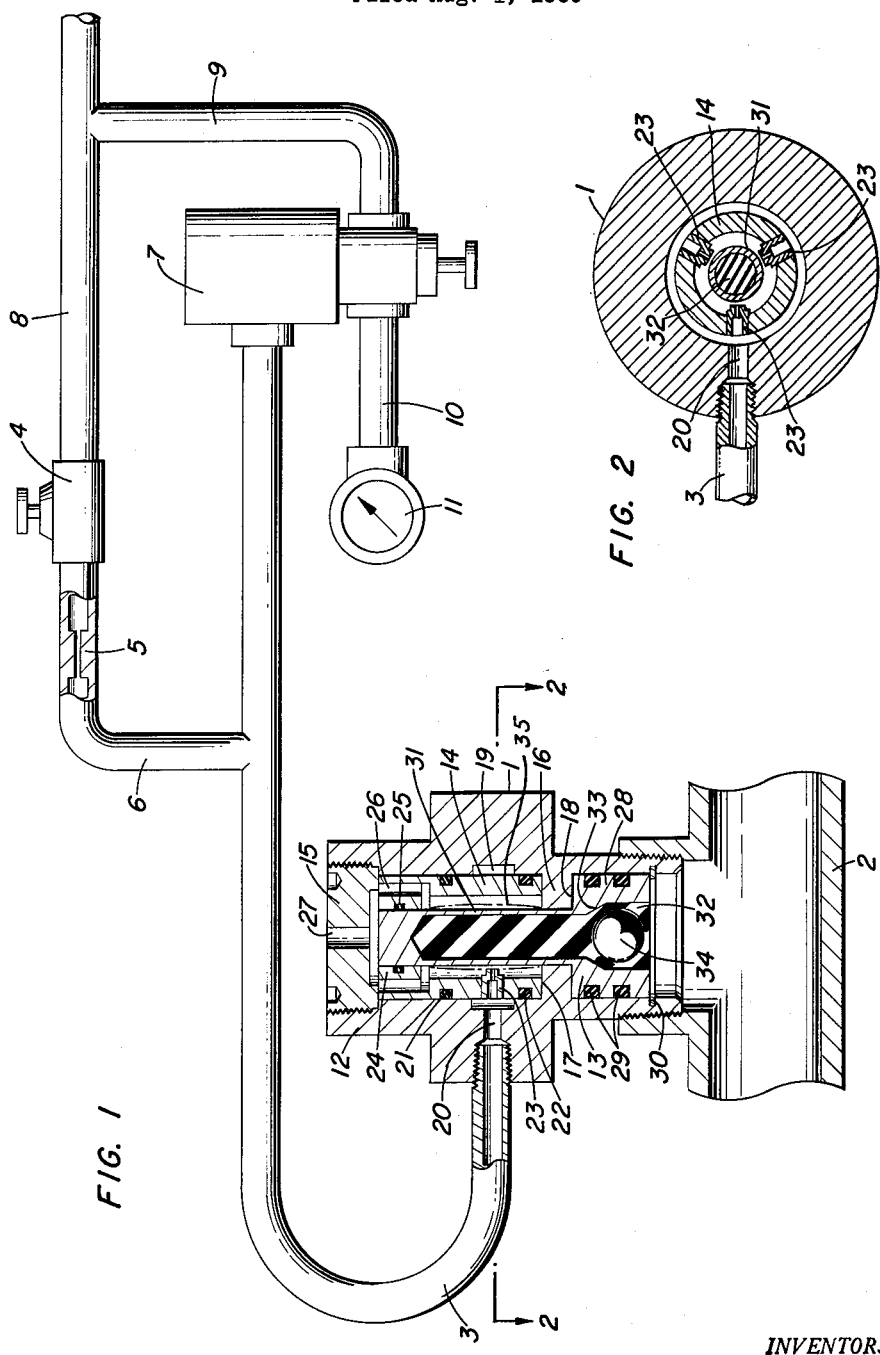
INVENTORS.
GEORGE V. COPLAND
ROBERT G. LOVE
BY Roy L. Van Winkle
AGENT.

United States Patent Office 3,084,548
Patented Apr. 9, 1963

3,084,548
PRESSURE TRANSMITTER
George V. Copland and Robert G. Love, Duncan, Okla., assignors to Halliburton Company, Duncan, Okla., a corporation of Delaware
Filed Aug. 1, 1960, Ser. No. 46,809
9 Claims. (Cl. 73—388)

This invention relates generally to apparatus useful in determining the pressure in a fluid container, pipe, or the like.

More specifically, it relates to apparatus wherein the pressure in a fluid container, pipe, or the like may be determined by converting the pressure therein to a proportional pressure signal suitable for use in conventional recorders and/or gauges.

Several types of pressure converters or transmitters are commercially available. These devices are however relatively delicate instruments which generally are not suited for field usage where rough handling occurs. As a result of their being delicate, the devices currently available also require the use of a separate device, commonly called a gauge protector, which prevents sudden surges of pressure from destroying or severely damaging them.

These devices are also constructed so that a relatively long pipe or hose extends from the device to the pressure source. The use of the relatively long pipe presents serious difficulties when using the device to measure the pressure of cement slurries or other materials which tend to harden or settle out in the pipe.

It is therefore one object of this invention to provide improved apparatus for determining the pressure in a pressure chamber, pipe, or the like.

Another object of this invention is to provide improved apparatus for determining the pressure of fluid in a pipe or other fluid container by converting the pressure exerted therein to an output air signal suitable for use in recorders and/or gauges.

A further object of this invention is to provide improved apparatus that is suitable for use in measuring the pressure in systems handling materials that tend to harden or settle out in the system thereby causing erroneous pressure indications.

Another object is to provide an improved pressure determining apparatus that is not sensitive to rough handling and normal temperature variations associated with field usage.

A pressure sensor constructed in accordance with the invention, includes a hollow body member attached to a pressure chamber, a hollow expandable member located in the body member and having its interior exposed to the pressure in the pressure chamber, one or more nozzles mounted in the body member with their outlets positioned relatively close to the exterior of the expandable member, and a fluid supply system connected to the inlet of the nozzles. The arrangement and construction of the parts of the sensor are such that changes in the pressure of the fluid flowing through the nozzles are proportional to changes in the dimension of the expandable member thus providing a sensor capable of transmitting a relatively low output signal to gauges or recorders which are calibrated to indicate directly the pressure in the pressure chamber.

The foregoing and additional objects and advantages of the invention will be more fully apparent when the following description is read in conjunction with the accompanying drawing wherein:

FIGURE 1 shows, partly in elevation and partly in cross-section, a view of one embodiment of the invention.

FIGURE 2 is a sectional view taken substantially on lines 2—2 as shown in FIGURE 1.

Referring to the drawing, shown therein is a pressure sensor 1 installed in a pressure chamber which is illustrated as being pipe 2. A pipe or conduit 3 is connected at one end to the pressure sensor 1 and at the other end to an air relay 7. A restriction 5 is located in a pipe or conduit 6 between the pressure sensor 1 and the regulator 4. The pipe 6 is connected at one end to the pipe 3 between the air relay 7 and the sensor 1. The other end of the pipe 6 is connected to a pressure regulator 4. An air supply pipe or conduit 8 is connected at one end to the regulator 4 and to an air supply, such as a compressor (not shown) at the other. A branch pipe or conduit 9 extends from the air supply pipe 8 to the air relay 7. An output air pipe or conduit 10 extends from the air relay 7 to a pressure indicator 11, such as a visual gauge or recording device.

The pressure sensor 1 includes a hollow body member 12, an expandable member 13 positioned within the body member 12, a sleeve member 14 located within the body member 12 and encircling a portion of the expandable member 13, and a vented plug 15 closing one end of the body member 12.

The hollow body member 12 has an interior flange 16 which provides an upwardly facing shoulder 17 and a downwardly facing shoulder 18. An annular groove 19 is formed in the interior of the body member 12 and is located slightly above the interior flange 16. A partially threaded port 20 extends through the wall of the body member 12 connecting the annular groove 19 with the air pipe 3.

The exterior of the sleeve member 14 is provided with upper and lower O-type seals 21 and 22, respectively. When the sleeve 14 is positioned in the body 12, the lower end thereof abuts the upwardly facing shoulder 17 of the body 12. The seals 21 and 22 engage the interior wall of body 12 above and below the annular groove 19, respectively. A plurality of hollow nozzles 23, preferably three because of the self-centering effect, are fixed in and extend through the wall of the sleeve 14. The nozzles 23 extend inwardly from the interior wall of the sleeve 14 and each has a discharge end terminating relatively close to the exterior of the expandable member 13.

A portion of reduced interior diameter 24 is provided at the upper end portion of the sleeve 14. An O-type seal 25 is located in the inner periphery of the portion of reduced diameter 24 and sealably engages the expansion member 13. Ports 26 extend through the portion 24 of the sleeve 14 permitting communication with the annular space or chamber 35 therein.

The sleeve 14 is retained in the body 12 between the upwardly facing shoulder 17 therein and the plug 15. The plug 15 is threaded into the top of hollow body member 12 and becomes an integral part thereof. It has a port 27 which is in communication with the ports 26 in the sleeve 14. The port 27 and ports 26 provide for venting the chamber 35 in the sleeve 14. The port 20 and the port 27 constitute inlet and outlet passageways in the hollow body member 12.

The hollow expandable member 13 has its upper end closed and is provided with an exterior flange 28 at its lower end portion. O-type seals 29, located in the periphery of the flange 28, sealably engage the interior of the body 12 below the interior flange 16. The expandable member 13 is retained in the body 12 between the downwardly facing shoulder 18 of the interior flange 16 and a retaining ring 30. The expandable member 13 has a central cylindrical wall portion or shell 31 of relatively thin but uniform wall thickness.

It will be seen that the above described arrangement provides an annular chamber 35 within the hollow body member 12 which is sealed at the top by O-rings 25 and at the bottom by O-rings 29, with the nozzle or nozzles 23 through the ports 26 and 27. The thin wall 31 of the member 13 constitutes one wall of this chamber 35 and as this wall 31 moves in and out radially, it controls the amount of air entering the chamber 35 through the nozzles.

The interior of the expansion member 13 is filled with a resilient material 32, such as rubber or equivalent material. The type of resilient material 32 used will depend upon the characteristics of the fluid to which it will be exposed.

That portion of the interior of the expansion member 13 located inside the flange 28 is provided with a tapered surface 33. A ball 34 of steel or other suitable material is located in the resilient material 32 in such a position that it will sealably engage the tapered surface 33 should sufficient movement of the resilient material 32 occur.

In the operation of apparatus constructed in accordance with the invention, air at a constant pressure of approximately 40 p.s.i. is supplied through pipe 8 from a conventional compressed air device (not shown). The air then passes through the pressure regulator 4 which is pre-set, depending on the input supply pressure, to control the sensitivity of the pneumatic output signal. The restriction 5 which is downstream from the regulator 4 in pipe 6 is provided to assure the linearity of the output air signal.

Air from pipe 6 flows into pipe 3 and subsequently into the annular groove 19 thence through the hollow nozzles 23. This air then escapes from the pressure sensor 1 by flowing through ports 26 in the sleeve 14 and out to the atmosphere through passageway 27 in the plug 15.

If pressure is applied in the pressure chamber 2, it will be transmitted to the interior of the expandable member 13. The relatively thin wall portion 31 of the expandable member 13 then moves outwardly a distance proportional to the pressure thus applied.

It can be seen that when this movement takes place, the effective area of the nozzles 23 through which the air must flow is thereby reduced. Since the nozzle area is reduced, a consequent increase in the pressure of the air in the pipe 3 supplying the nozzles takes place. This increase in air pressure is a function of the hydraulic pressure in the pressure chamber 2 and if suitable instruments were available and calibrated to read in proper units, the hydraulic pressure could be read directly from pipe 3. However, commercial pneumatic gauges and recorders are conventionally manufactured to operate on an air pressure input signal of approximately 3–15 p.s.i. It is for this reason that the air relay 7 is provided. The type of air relay 7 used is commercially available and a complete description of its construction and operation is shown in Moore Products Company's Bulletin No. AD-68 printed in March 1959, and entitled "Pneumatic Multi-Function Computing Relays." The air signal in the pipe 3 will be about 20 to 30 p.s.i. and the air relay 7 then changes this signal to an output pressure in pipe 10 of from 3–15 p.s.i. The hydraulic pressure may either be read on the visual gauge 11 or recorded on a pressure recorder (not shown).

It is of course necessary to calibrate the gauge 11 with the air pressure in pipe 3 so that, e.g., 15 p.s.i. air pressure in pipe 3 would represent zero p.s.i. hydraulic pressure. Any increase in hydraulic pressure results in a proportional increase in air pressure in pipe 3 with a corresponding increase in the reading of gauge 11.

Although the resilient material 32 and the ball 34 are not absolutely necessary to the operation of the device, they provide some very important advantages.

The resilient material 32 prevents any of the pressure fluid from entering the expandable member 13 of the sensor 1, thus eliminating false reading due to foreign materials hardening therein. If the expandable member 13 should rupture and a sufficient portion of the resilient material 32 extrude therethrough, the ball 34 will seal on the tapered surface 33 of the expandable member 13 thus preventing the possibility of serious damage due to escaping high pressure hydraulic fluid.

Apparatus constructed in accordance with the invention is particularly suited for the measurement of high pressures such as 5,000 to 20,000 p.s.i. It may however be used for measuring low pressures, if the expandable member 13 is suitably designed and constructed of a material which will respond thereto.

The embodiment shown and described herein is by way of example only and it should be understood that modifications and variations may be made thereto without departing from the spirit of the invention or the scope of the annexed claims.

We claim:

1. Apparatus for measuring the intensity of pressure of a high-pressure fluid, comprising in combination: a body member having an opening therein, a hollow expandable member having an outer portion thereof extending within said opening, said expandable member having an interior portion filled with rubber, the rubber being subjected to the pressure of said high-pressure fluid, at least one nozzle on said body member having a discharge end portion adjacent said outer portion of said expandable member, said body member having an inlet passageway communicating with said nozzle, and low-pressure fluid supply means connected to said inlet passageway, whereby pressure of said high-pressure fluid acting through the rubber expands said expandable member toward said nozzle to restrict the flow of low-pressure fluid therethrough.

2. Apparatus for measuring the intensity of pressure of a hydraulic fluid, comprising in combination: a body member having an opening therein, a hollow expandable member having an outer portion thereof extending concentrically within said opening, said expandable member having an interior portion filled with rubber, the rubber having an exposed portion subjected to the pressure of said hydraulic fluid, a plurality of nozzles on said body member each having a discharge end portion adjacent said expandable member, said body member having an inlet passageway communicating with said nozzles, and air pressure supply means connected to said inlet passageway, whereby pressure of said hydraulic fluid expands said expandable member toward said nozzles to restrict the flow of air therethrough.

3. In apparatus for determining the pressure in a container, a hollow body member connected to said container, said body member having an interior chamber therein, and also having an inlet and an outlet passageway extending through the wall thereof, a nozzle on the body member having a central passageway therethrough communicating with said inlet passageway and discharging into said annular chamber, fluid supply means connected to said inlet passageway, a hollow expandable member mounted for expansion in said hollow body member and forming one wall of said annular chamber, said expandable member being filled with a resilient material having a portion thereof exposed to pressure in said container whereby the fluid in said container exerts pressure on said expandable member but is prevented from entering the same, said nozzle having an end portion thereof adjacent said expandable member, the arrangement and construction being such that pressure applied in said container expands said expandable member toward said nozzle restricting the flow of fluid through said nozzle whereby the pressure in said inlet passageway and fluid supply means is proportional to the pressure in said container.

4. The invention of claim 3 wherein said hollow expandable member has an interior surface near one end thereof, a sealing member located in said resilient material, said sealing member and said interior surface coacting upon a predetermined movement of said resilient material to form a seal thereby preventing further application of fluid pressure to the interior of said expandable member.

5. Apparatus for measuring the intensity of pressure of a high-pressure fluid, comprising in combination: a body member having a cylindrical opening therein, a hollow expandable member having an outer cylindrical portion thereof extending concentrically within said opening and defining an annular space, said expandable member having an interior portion filled with rubber, the rubber being subjected to the pressure of said high-pressure fluid, a plurality of nozzles on said body member each having a discharge end portion in said space and adjacent said expandable member, said body member having an inlet passageway communicating with said nozzles, and low-pressure fluid supply means connected to said inlet passageway, whereby pressure of said high-pressure fluid acting through said rubber expands said expandable member toward said nozzles to restrict the flow of low-pressure fluid therethrough.

6. The combination of claim 5 in which the body member is provided with means for venting said annular space.

7. Apparatus for measuring the intensity of pressure of a high-pressure fluid, comprising in combination: a body member having an opening therein, a hollow expandable member having an outer portion thereof extending concentrically within said opening, said expandable member having an interior portion filled with rubber, the rubber having an exposed portion subjected to the pressure of said high-pressure fluid, at least one nozzle on said body member having a discharge end portion adjacent said expandable member, said body member having an inlet passageway communicating with said nozzle, and low-pressure fluid supply means connected to said inlet passageway, whereby pressure of said high-pressure fluid acting through the rubber expands said expandable member toward said nozzle to restrict the flow of low pressure fluid therethrough.

8. The combination set forth in claim 7 in which a relatively rigid element engaging said rubber cooperates with a portion of said expandable member to limit the intensity of pressure applied to the interior thereof.

9. The combination set forth in claim 7 in which the hollow expandable member has an internal tapered section and wherein a metal ball is embedded within the rubber and cooperates with said internal tapered section to limit the intensity of pressure applied to the interior of the hollow expandable member.

References Cited in the file of this patent

UNITED STATES PATENTS

| 2,365,015 | Simmons | Dec. 12, 1944 |
| 2,472,812 | Gibbons | May 31, 1949 |
| 2,872,812 | Jones et al. | Feb. 10, 1959 |
| 2,960,097 | Scheffler | Nov. 15, 1960 |

FOREIGN PATENTS

| 276,755 | Switzerland | Oct. 16, 1951 |